US010769517B2

(12) United States Patent
Tan et al.

(10) Patent No.: US 10,769,517 B2
(45) Date of Patent: Sep. 8, 2020

(54) NEURAL NETWORK ANALYSIS (71) Applicant: FUJITSU LIMITED, Kawasaki-shi, Kanagawa (JP)

(72) Inventors: Xuan Tan, Sunnyvale, CA (US); Nikola Nedovic, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 908 days.

(21) Appl. No.: 15/062,067

(22) Filed: Mar. 5, 2016

(65) Prior Publication Data
US 2017/0255859 A1 Sep. 7, 2017

(51) Int. Cl.
G06N 3/02 (2006.01)

(52) U.S. Cl.
CPC .................... G06N 3/02 (2013.01)

(58) Field of Classification Search
CPC .............. G06N 3/0427; G06N 3/02
See application file for complete search history.

(56) References Cited

U.S. PATENT DOCUMENTS

| 5,058,049 | A | * | 10/1991 | Anderson | G06N 3/0635 708/820 |
| 5,506,801 | A | * | 4/1996 | Tawel | G06T 9/008 708/801 |
| 5,539,638 | A | * | 7/1996 | Keeler | F02D 41/1401 123/672 |
| 5,797,121 | A | * | 8/1998 | Fette | G10L 19/06 704/230 |
| 2011/0243207 | A1 | * | 10/2011 | Tang | H04B 7/0626 375/224 |
| 2013/0055270 | A1 | * | 2/2013 | Dabagh | G06F 15/1735 718/102 |
| 2015/0195145 | A1 | * | 7/2015 | Di Pietro | H04L 43/0876 706/12 |
| 2015/0261702 | A1 | * | 9/2015 | Culurciello | G06F 13/28 710/308 |

(Continued)

OTHER PUBLICATIONS

"Compressing Neural Network with Hashing Trick", ICML 2015, Wenlin et al., Apr. 19, 2015.

(Continued)

Primary Examiner — Li B. Zhen
Assistant Examiner — Markus A. Vasquez
(74) Attorney, Agent, or Firm — Maschoff Brennan (57) ABSTRACT According to some embodiments, the present disclosure may relate to a method of neural network analysis that includes receiving a first electronic message, storing it in a storage device, and decoding it to output a first data structure. The first electronic message may reference a first dictionary entry correlating the first electronic message to the first data structure including more bits than the first message. The method may also include providing the first data structure to a processing element to perform a data structure analysis on the first data structure yielding a second data structure including more bits than the first electronic message. The method may also include matching the second data structure to a second dictionary entry correlating the second data structure to a second electronic message that includes fewer bits than the second data structure, and transmitting the second electronic message instead of the second data structure.

19 Claims, 4 Drawing Sheets (56) References Cited

U.S. PATENT DOCUMENTS

2016/0253434 A1* 9/2016 Yu ................... G06F 17/2785
                                                                 707/760

OTHER PUBLICATIONS

"Deep Learning with Limited Numerical Precision", ICML 2015, Suyog et al., Feb. 9, 2015.
"Low precision storage for deep learning", ICLR 2015, Matthieu et al., Feb. 26, 2015.
"Project Adam: Building an Efficient and Scalable Deep Learning Training System", OSDI 2014, Trishul et al., Oct. 2014.
"Can Deep Learning Revolutionize Mobile Sensing", HotMobile 2015, Nicholas et al., Feb. 2015.
"ShiDianNao: Shifting Vision Processing Closer to the Sensor", ISCA 2015, Zidongdu et al., Jun. 2015.
"DaDianNao: A Machine-Learning Supercomputer", MICRO 2014, Yunji et al., Jan. 2015.
"Deep Compression: Compressing Deep Neural Networks with Pruning, Trained Quantization and Huffman Coding" S. Han, et al., ICLR 2016, Feb. 15, 2016.

* cited by examiner

NEURAL NETWORK ANALYSIS

FIELD

One or more embodiments discussed in the present disclosure are related to neural network analysis.

BACKGROUND

Neural network analysis may include models of analysis inspired by biological neural networks attempting to model high-level abstractions through multiple processing layers. However, neural network analysis may consume large amounts of computing and/or network resources.

The subject matter claimed in the present disclosure is not limited to embodiments that solve any disadvantages or that operate only in environments such as those described above. Rather, the background is only provided to illustrate one example technology area where some embodiments described in the present disclosure may be practiced.

SUMMARY

One or more embodiments of the present disclosure may include a method of neural network analysis that includes receiving a first electronic message and storing the first electronic message in a storage device. The method also may include decoding the first electronic message to output a first data structure where the first electronic message references a first dictionary entry that correlates the first electronic message to the first data structure that includes more bits than the first electronic message. The method may also include providing the first data structure to a processing element to perform a data structure analysis in the neural network on the first data structure that may yield a second data structure that includes more bits than the first electronic message. The method may also include matching the second data structure to a second dictionary entry that correlates the second data structure to a second electronic message that includes fewer bits than the second data structure. The method may also include transmitting the second electronic message instead of the more complex second data structure. The method may additionally include testing performance of a second dictionary that includes the second dictionary entry, and, based on the test of the second dictionary, adjusting the size of the second dictionary.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Neural network analysis may include receiving inputs for analysis and passing those inputs through one or more intermediate layers to perform data structure analyses (e.g., analyses on a data structure). The outputs of the data structure analysis of one layer may be passed to an adjacent layer to perform an additional data structure analysis, and so on until the entire neural network analysis is completed and a result is outputted. Such a neural network analysis may be resource intensive, both in storing all of the inputs and outputs of the intermediate layers and in transmitting data between the intermediate layers.

In some embodiments of the present disclosure, a dictionary of a limited size may be utilized with dictionary entries of electronic messages and corresponding data structures such that a simple electronic message may be transmitted between intermediate layers of a neural network rather than transmitting the more complex data structures used in data structure analyses of the intermediate layers. For example, after a layer performs a data structure analysis, the data structure output from the data structure analysis may be located in a first dictionary that includes electronic messages. The electronic message from the first dictionary that corresponds to the output data structure may be sent to another network layer in place of the intermediate data structure. After receiving the electronic message, the other network layer may use a second dictionary with the same or similar entries of the first dictionary to locate the electronic message and the corresponding data structure associated with the electronic message. The other network layer may perform a data structure analysis on the data structure. By using the dictionaries, the simpler electronic messages may be stored and transmitted in place of the more complex data structures to thereby reduce both a transmission bandwidth and a storage capacity of the intermediate layers and thus the neural network.

The present disclosure may also relate to preparing such a neural network. In these and other embodiments, potential results for data structure analyses at each intermediate layer may be determined and a size of dictionaries for the intermediate layers of the neural network may be selected. In some embodiments, the number of potential results may be larger than the selected size of the dictionaries. In these and other embodiments, the potential results may be clustered to limit the number of dictionary entries to the selected size of the dictionaries. For example, if the selected size of the dictionaries is thirty-two entries and there are ninety potential results for a given layer, then thirty-two representative potential results may be selected as dictionary entries for the dictionary for the given layer. The neural network may be tested with the dictionaries of the selected size. If the neural network performs well with the selected size of the dictionaries, the dictionaries may be stored and used in the neural network. If the neural network does not perform well, the size of the dictionaries may be modified to improve performance.

As used in the present disclosure, a "dictionary" may include any computer-readable data that includes one or more "entries" to associate one item with another. For example, a dictionary entry may associate a simple electronic message (e.g., a five bit value) with a more complex data structure (e.g., a thirty-two bit floating value). A dictionary may be queried by one of the entries (e.g., the simple electronic message) and receive as an output the correlated entry. For example, a query by a simple electronic message may result in the output of a more complex data structure and a query by a more complex data structure may result in the output of a simple electronic message.

As used in the present disclosure, with reference to neural network layers, the term "adjacent" may refer to neural network layers that provide inputs and/or outputs to one another. For example, if a given neural network layer provides inputs to multiple other neural network layers, then the given neural network layer may be adjacent to all of the multiple other neural network layers. Additionally, the term "previous" and "following," with reference to neural network layers, may refer to directly adjacent neural network layers, or may include other neural network layers further up or down an analysis chain.

Embodiments of the present disclosure are explained with reference to the accompanying drawings.

Figure 1:
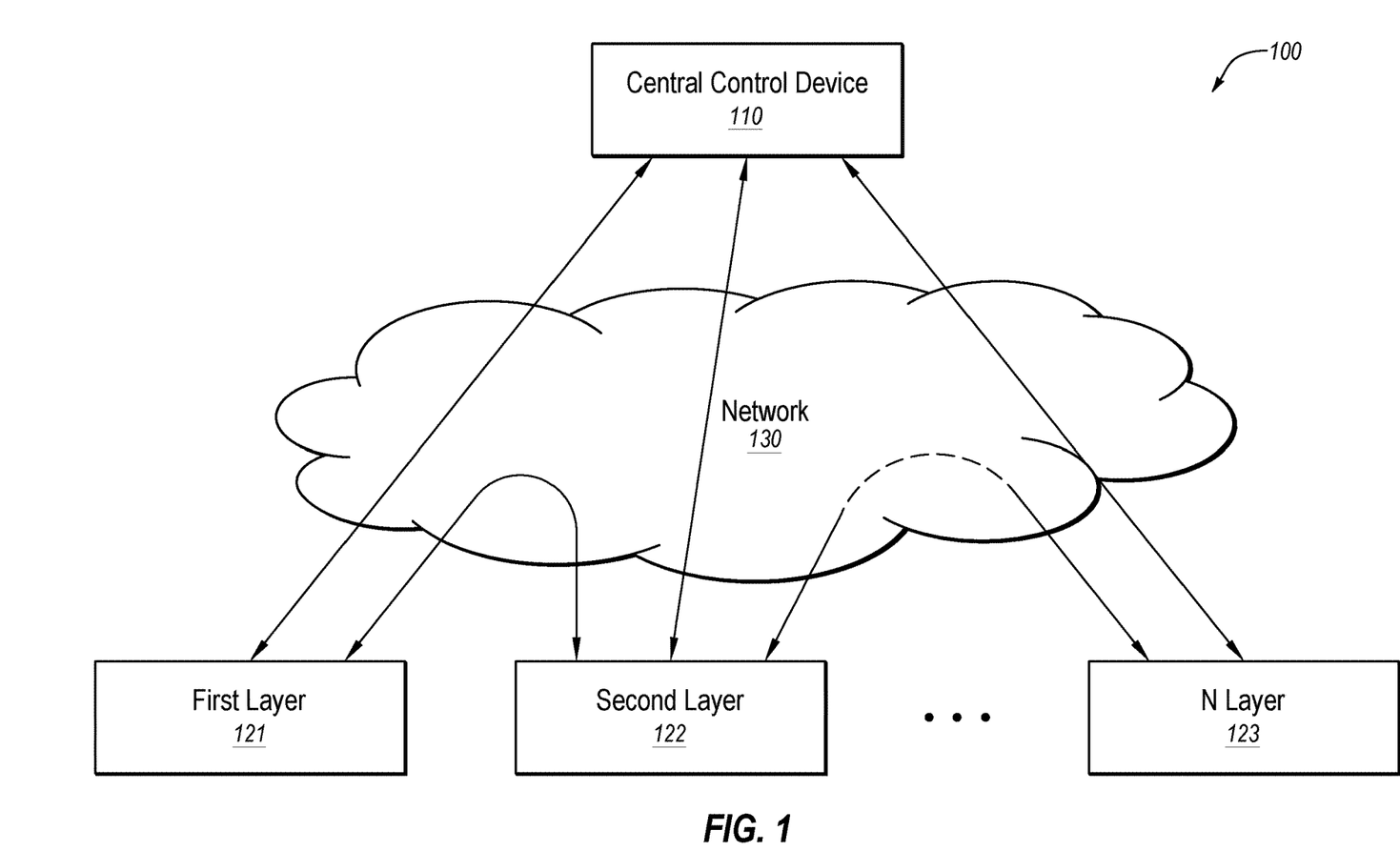
FIG. 1 is a diagram representing an example system for performing neural network analysis.

FIG. 1 is a diagram representing an example system 100 for performing neural network analysis, in accordance with one or more embodiments of the present disclosure. The system 100 may include a central control device 110 and multiple layers, for example, a first layer 121, a second layer 122, and an N layer 123. As illustrated by the ellipses and by use of the variable N, any number of layers may be included in the system 100. The system 100 may also include a network 130 for communication between the central control device 110 and/or the layers 121, 122, and 123 of the system 100.

Neural network analysis may include any analysis that may account for a large amount of data, a large numbers of inputs, and/or that may benefit from learning from examples in performing the analysis. For example, the neural network analysis may include forecasting, categorization, scenario prediction, complex function modeling, regression, etc. In some embodiments, the neural network analysis may include categorizing an image, and the intermediate layers may perform tasks such as finding edges, determining shapes, identifying higher-order features (e.g., nose, mouth, roof, etc.), and categorizing an image based on higher-order features, etc.

The central control device 110 may include any number of systems, devices, components, or combinations thereof configured to control, direct, or otherwise interact with the neural network 100. For example, an input or set of inputs for analysis in the system 100 may be provided via the central control device 110. As another example, the central control device 110 may provide an output results from a neural network analysis performed via the system 100.

In some embodiments, the central control device 110 may communicate, via the network 130, with one or more of the layers of the system 100 (e.g., the first layer 121, the second layer 122, and/or the N layer 123). For example, the central control device 110 may transmit an input to the first layer 121 to begin the neural network analysis, and may receive from the N layer 123 an output of the neural network analysis based on the input. Additionally or alternatively, the central control device 110 may communicate one or more dictionaries to one or more of the layers of the system 100.

The layers of the system 100 may be in communication with other adjacent layers in the system 100 via the network 130. For example, the first layer 121 may be in communication with the second layer 122, and the second layer 122 may be in communication with the N layer 123. In these and other embodiments, each successive layer in the system 100 may perform iterative steps in the neural network analysis. For example, the first layer 121 may perform a first set of data structure analyses and may pass the output generated by the first set of data structure analyses to the second layer 122; the second layer 122 may perform a second set of data structure analyses and may pass the output generated by the second set of data structure analyses to the N layer 123; the N layer 123 may perform an N set of data structure analyses and may pass the output generated by the N set of data structure analyses to the central control device 110. In some embodiments, the layers may transmit placeholder electronic messages rather than the actual data output from the data structure analyses.

The network 130 may include any device, system, component, or combination thereof configured to provide communication between one or more of the central control device 110 and/or the layers of the system 100. By way of example, the network 130 may include one or more wide area networks (WANs) and/or local area networks (LANs) that enable the central control device 110 and/or the layers of the system 100 to be in communication. In some embodiments, the network 130 may include the Internet, including a global internetwork formed by logical and physical connections between multiple WANs and/or LANs. Alternately or additionally, the network 130 may include one or more cellular RF networks and/or one or more wired and/or wireless networks such as, but not limited to, 802.xx networks, Bluetooth access points, wireless access points, IP-based networks, or the like. The network 130 may also include servers that enable one type of network to interface with another type of network. Additionally or alternatively, the network 130 may include an Intranet, or one or more computing devices in communication within an organization or an in otherwise secure manner.

In some embodiments, the system 100 may be implemented as a single stand-alone device. In these and other embodiments, the central control device 110 and the layers 121, 122, and/or 123 may be logical representations and the communication may be between and/or among different physical and/or logical components of a single stand-alone device. For example, communication between the first layer 121 and the second layer 122 may be an output from one process running on a physical processor to a second process running on the physical processor or another processor of the device. In these and other embodiments, the system 100 may be implemented as a desktop computer, a laptop computer, a server computer (including multiple blades and/or racks of individual server computers), a tablet computer, a mobile phone, a smartphone, a personal digital assistant (PDA), an e-reader device, a video-game console, or other suitable computer device. In these and other embodiments, the network 130 may include circuit connections within the device.

In some embodiments, the system 100 may be implemented as a distributed system. For example, the central control device 110 may be implemented as a central server or other computing device at which a user may input a query for neural network analysis and/or observe an output of a neural network analysis. Each of the layers may be implemented as a stand-alone device, such as a desktop computer, a laptop computer, a server computer, a tablet computer, a mobile phone, a smartphone, a personal digital assistant (PDA), an e-reader device, a video-game console, or other suitable computer device. The central control device 110 may assign certain neural network tasks of a given layer to a given device or combination of devices. In these and other embodiments, the physical devices operating the layers of the system 100 may have limited computing resources, such as limited power, limited memory, limited storage, and/or limited processing capability. However, by having multiple distributed devices operating the layers of the system 100, the processing and computing demand may be distributed throughout a network of communicating devices.

Modifications, additions, or omissions may be made to the system 100 without departing from the scope of the present disclosure. For example, in some embodiments, the system 100 may include any number of other components that may not be explicitly illustrated or described. For example, the system 100 may include any number of layers. As an additional example, any number of components may provide inputs into the neural network for analysis (e.g., there may be multiple devices, rather than a single central control device 110, that provide inputs to the first layer 121). As an additional example, there may be interconnections between the layers besides just directly adjacent layers. For example, depending on the neural network analysis, the first layer 121 may provide a first output to the second layer 122 and a second output to the N layer 123.

Figure 2:
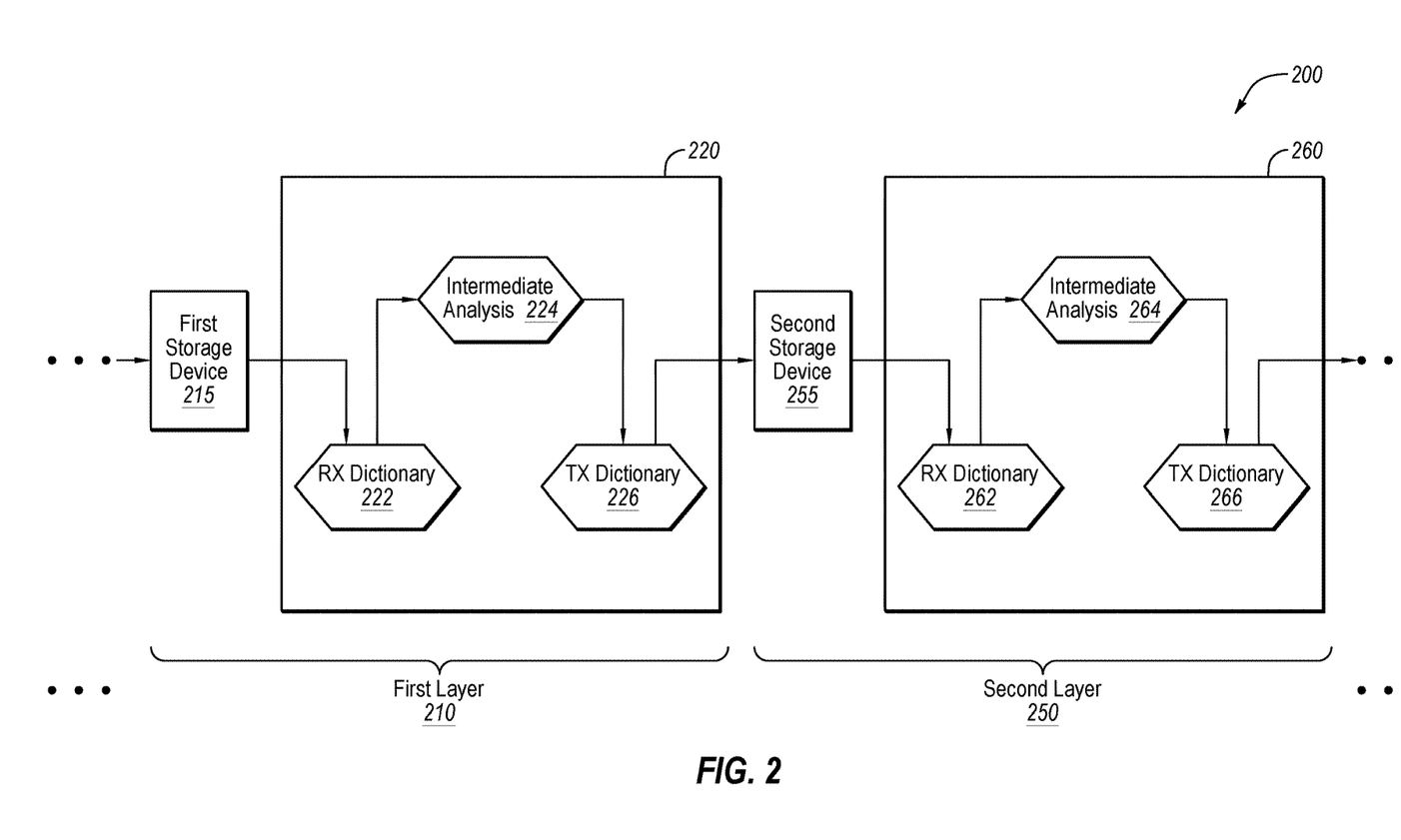
FIG. 2 is a diagram representing two example layers of a neural network system.

FIG. 2 is a diagram representing two example layers of a neural network system 200, in accordance with at least one embodiment of the present disclosure. For simplicity in explaining principles of the present disclosure, only two layers are illustrated but any number of layers and inputs are contemplated within the scope of the present disclosure. FIG. 2 may include hexagonal elements which may represent functional tasks or logical features rather than physical components. The arrows in FIG. 2 may represent a logical flow of information within the neural network system 200, in accordance with at least one embodiment of the present disclosure.

The neural network system 200 may include a first layer 210 and a second layer 250. The first layer 210 may include a first storage device 215 and a first processing element 220. The first processing element 220 may include logical tasks and/or functions associated with the first processing element 220, and such tasks and/or functions may be illustrated with hexagonal elements in FIG. 2. The first processing element 220 may include a first receiving dictionary 222, a first data structure analysis 224, and a first transmitting dictionary 226. The second layer 250 may include a second storage device 255 and a second processing element 260. The second processing element 260 may include logical tasks and/or functions associated with the second processing element 260, and such tasks and/or functions may be illustrated with hexagonal elements in FIG. 2. The second processing element 260 may include a second receiving dictionary 262, a second data structure analysis 264, and a second transmitting dictionary 266. The ellipses on either side of the first layer 210 and the second layer 250 indicate that the first layer 210 and the second layer 250 may be two of any number of layers within the neural network system 200.

The first storage device 215 and the second storage device 255 may include computer-readable storage media for carrying or having computer-executable instructions or data structures stored thereon. For example, electronic messages may be stored in the first storage device 215 and/or the second storage device 255. As another example, the dictionary entries of the first receiving dictionary 222 and the first transmitting dictionary 226 may be stored in the first storage device 215 and utilized and/or recalled by the first processing element 220; and the dictionary entries of the second receiving dictionary 262 and the second transmitting dictionary 266 may be stored in the second storage device 255 and utilized and/or recalled by the second processing element 260. Such computer-readable storage media may include any available media that may be accessed by a general-purpose or special-purpose computer, such as the first or second processing elements 220 and 260. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), hard disk drives (HDD), solid state drives (SSD), or any other storage medium which may be used to carry or store desired program code in the form of computer-executable instructions or data structures and which may be accessed by a general-purpose or special-purpose computer. The computer-readable storage media may be configured as a stand-alone media or as part of some other system, component, or device. The computer-readable storage media may be configured as a physical media or as a virtualized media. Combinations of any of the above may also be included within the scope of computer-readable storage media. Computer-executable instructions may include, for example, instructions and data configured to cause a processing element (e.g., the first or second processing elements 220 and 260) to perform a certain operation or group of operations.

The first and/or second processing elements 220 and 260 may include any suitable special-purpose or general-purpose computer, computing entity, or processing device including various computer hardware or software modules and may be configured to execute instructions stored on any applicable computer-readable storage media, such as the first storage device 215 and/or the second storage device 255. For example, the first and/or second processing elements 220 and 260 may include a processor, a multi-core processor, a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as single processing elements in FIG. 2, the first and second processing elements 220 and 260 may include any number of processors configured to perform, individually or collectively, any number of operations described in the present disclosure. Additionally, one or more of the processors may be present on one or more different electronic devices, such as different devices coupled together or communicating remotely.

Each of the first layer 210 and the second layer 250 may receive communications and may transmit electronic communications, such as electronic messages. Such communication may be over a network, such as the network 130 of FIG. 1. In these and other embodiments, each of the first layer 210 and the second layer 250 may include a communication component compatible with the network over which the layers are communicating. For example, a network may exist between the first processing element 220 and the second storage device 255.

Each of the first receiving dictionary 222, the first transmitting dictionary 226, the second receiving dictionary 262, and the second transmitting dictionary 266 may include any computer-readable data that includes one or more entries to associate one item with another. For example, the dictionary entries may associate a simple electronic message (e.g., a five bit value) with a more complex data structure (e.g., a thirty-two bit floating value). A dictionary may be queried by one of the entries (e.g., the simple electronic message) and receive as an output the correlated entry. For example, a query by a simple electronic message may result in the output of a more complex data structure and a query by a more complex data structure may result in the output of a simple electronic message. In these and other embodiments, the dictionaries may be stored on a storage device (e.g., the first receiving dictionary 222 and the first transmitting dictionary 226 may be stored on the first storage device 215) and may be utilized by a processing element (e.g., the first processing element 220 may utilize the first receiving dictionary 222 and the first transmitting dictionary 226).

In operation, the first layer 210 may receive a first electronic message that may be stored in the first storage device 215. The first electronic message may be a simple electronic message. The first processing element 220 may read the first electronic message from the first storage device 215 and may locate the first electronic message in the first receiving dictionary 222. The first receiving dictionary 222 may include an entry correlating the first electronic message to a first data structure that is more complex than the first electronic message. For example, the first electronic message may be limited to a few bits, such as four, five, six, or more bits, and the first data structure may be a twenty, thirty, thirty-two, thirty-five, forty, fifty, sixty, or sixty-four bit floating point value. The first receiving dictionary 222 may output the first data structure. In some embodiments, the difference between the bits in the first electronic message and the first data structure may be one-half an order of magnitude, a full order of magnitude, or some other difference.

The first data structure may be used in the first data structure analysis 224 to perform the neural network analysis tasked to the first layer 210. The first data structure analysis 224 may produce a second data structure, which may be provided to the first transmission dictionary 226. The first transmission dictionary 226 may locate the second data structure and output a corresponding second electronic message. The second electronic message may be less complex than the second data structure. For example, the second electronic message may be limited to a few bits, such as four, five, six, or more bits, and the second data structure may be a twenty, thirty, thirty-two, thirty-five, forty, fifty, sixty, or sixty-four bit floating point value. The first transmitting dictionary 226 may output the second electronic message. In some embodiments, the difference between the bits in the second electronic message and the second data structure may be one-half an order of magnitude, a full order of magnitude, or some other difference.

In some embodiments, the output of the first data structure analysis 224 may be different than any of the entries in the first transmitting dictionary 226. In these and other embodiments, the output may be compared to the entries of the first transmitting dictionary 226 and the entry with the closest value may be selected as a match to the output. The closest value may be selected based on an absolute distance between the two values, based on weighted entries, based on rounding the output, etc. As described above, after selecting the matching dictionary entry, the electronic message corresponding to the matching dictionary entry may be output.

The first layer 210 may send the second electronic message to the second layer 250. The second layer 250 may store the second electronic message in the second storage device 255. The second layer 250 may handle the second electronic message in a similar manner to how the first layer 210 handles the first electronic message. For example, the second electronic message may be looked up in the second receiving dictionary 262 to identify and output the corresponding second data structure to be used in the second data structure analysis 264. The second data structure analysis 264 may output a third data structure which may be looked up in the second transmission dictionary 266 to identify and output a third electronic message. The third electronic message may be sent to a following layer of the neural network system 200.

In some embodiments, the transmitting and receiving dictionaries of adjacent layers in the neural network system 200 may be correlated, and may include one or more overlapping entries and may include one or more differing entries. For example, the first transmitting dictionary 226 and the second receiving dictionary 262 may have at least some overlapping entries such that the same electronic message corresponds to the same data structure in both dictionaries, and may have one or more differing entries. In these and other embodiments, rather than transmitting the full data structure, the less complex electronic message may be transmitted and stored. Using such dictionary entries may preserve computing resources by preserving network bandwidth and by preserving storage space. In some embodiments, the transmitting dictionary from a previous neural network layer and the receiving dictionary from a following neural network layer may be identical (e.g., the first transmitting dictionary 226 and the second receiving dictionary 262 may have the same entries). In some embodiments the number of entries in a dictionary may be limited for a given layer or for a given neural network system. For example, the dictionary size may be limited to two, four, eight, sixteen, thirty-two, sixty-four, one hundred twenty-eight, etc. entries, or may be limited to five, ten, fifteen, etc. entries. In some embodiments, the size of the dictionary may be based on the devices used to implement the layers of the neural network system 200. For example, if mobile devices are to be used to implement the layers of the neural network system 200, the size of the dictionary may be smaller than if server computers are used to implement the layers of the neural network system 200. In some embodiments, the size of the dictionary may be related to the size of the electronic message. For example, for thirty-two entries, the electronic message may include five bits; for sixteen entries, the electronic message may include four bits; etc.

Modifications, additions, or omissions may be made to the neural network system 200 without departing from the scope of the present disclosure. For example, in some embodiments, the neural network system 200 may include any number of other components that may not be explicitly illustrated or described. For example, the neural network system 200 may include any number of layers. As another example, the layers may include a communication component for transmitting and/or receiving electronic messages. As an additional example, the storage device 215 and the processing element 220 may be implemented as a single device, such as a dedicated ASIC or FPGA.

Figure 3:
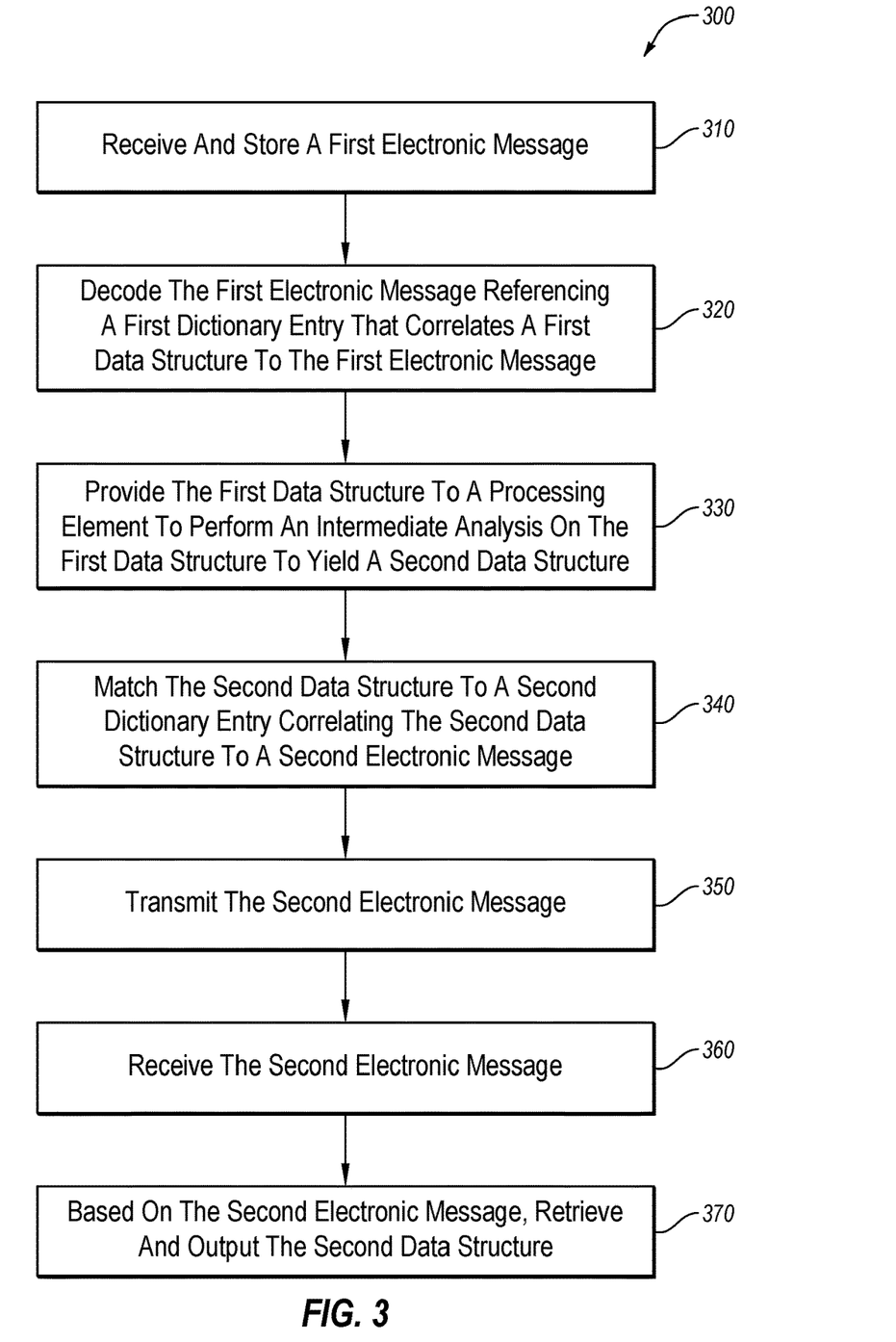
FIG. 3 is a flowchart of an example method of neural network analysis.

FIG. 3 is a flowchart of an example method 300 of neural network analysis, in accordance with one or more embodiments of the present disclosure. The method 300 may be performed by any suitable system, apparatus, or device. For example, the system 100 of FIG. 1 or the neural network system 200 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

At block 310, a first electronic message may be received. For example, a first layer (e.g., the first layer 121 of FIG. 1 or the first neural network layer 210 of FIG. 2) of a neural network system (e.g., the system 100 of FIG. 1 or the neural network system 200 of FIG. 2) may receive the first electronic message from a previous neural network layer and/or a central control device (e.g., the central control device 110 of FIG. 1). The first electronic message may be a simple electronic message.

At block 320, the first electronic message may be decoded. For example, the first electronic message may be provided to a dictionary (e.g., the first receiving dictionary 210 of FIG. 2) with a first dictionary entry that correlates the first electronic message to a first data structure. In some embodiments the first data structure may be more complex than the first dictionary entry. The first data structure being more complex than the first dictionary entry may indicate that the first data structure includes more bits than the first dictionary entry.

At block 330, the first data structure may be provided to a processing element (e.g., the processing element 220 of FIG. 2) to perform a data structure analysis (e.g., the first data structure analysis 224 of FIG. 2) on the first data structure to yield a second data structure. For example, the processing element may retrieve the first data structure out of a storage device (e.g., the first storage device 215 of FIG. 2).

At block 340, the second data structure may be matched to a second dictionary entry correlating the second data structure to a second electronic message. For example, the processing element may compare the second data structure to dictionary entries in a transmitting dictionary (e.g., the first transmitting dictionary 226) until the second data structure is located and the electronic message correlated with the second data structure may be output from the transmitting dictionary. In some embodiments, the second data structure may not be an exact match to any of the dictionary entries. In these and other embodiments, a closest entry may be selected as a match, for example, by rounding the second data structure, by measuring the distance between the second data structure and the dictionary entries, etc. The electronic message correlated with the closest match to the second data structure may be output from the transmitting dictionary.

At block 350, the second electronic message may be transmitted. For example, the second electronic message may be transmitted from the first layer of the neural network system to a second layer (e.g., the second layer 122 of FIG. 1 or the second neural network layer 250 of FIG. 2). In some embodiments, the second electronic message may be transmitted instead of transmitting the entire second data structure from the first layer to the second layer.

At block 360, the second electronic message may be received at the second layer of the neural network. The second electronic message may also be stored, for example, in a storage device associated with the second layer (e.g., the second storage device 255 of FIG. 2).

At block 370, based on the second electronic message, the second data structure or the closest entry that is correlated to the second electronic message may be retrieved and output in the second layer. For example, the second electronic message may be read from the storage device associated with the second layer and compared to a dictionary entry of a receiving dictionary in the second layer (e.g., the second receiving dictionary 262 of FIG. 2). After the second electronic message is located in the receiving dictionary, the correlated data structure may be output. For example, the second data structure corresponding to the second electronic message may be retrieved or output from the dictionary and provided to a second data structure analysis (e.g., the second data structure analysis 264 of FIG. 2). In some embodiments, the transmitting dictionary of the first layer may be the same as the receiving dictionary of the second layer.

Accordingly, the method 300 may be used for neural network analysis. Modifications, additions, or omissions may be made to the method 300 without departing from the scope of the present disclosure. For example, the blocks 350, 360, and/or 370 may be omitted. As another example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. For example, the method 300 may be extrapolated to any number of layers and may handle any number of inputs.

Figure 4:
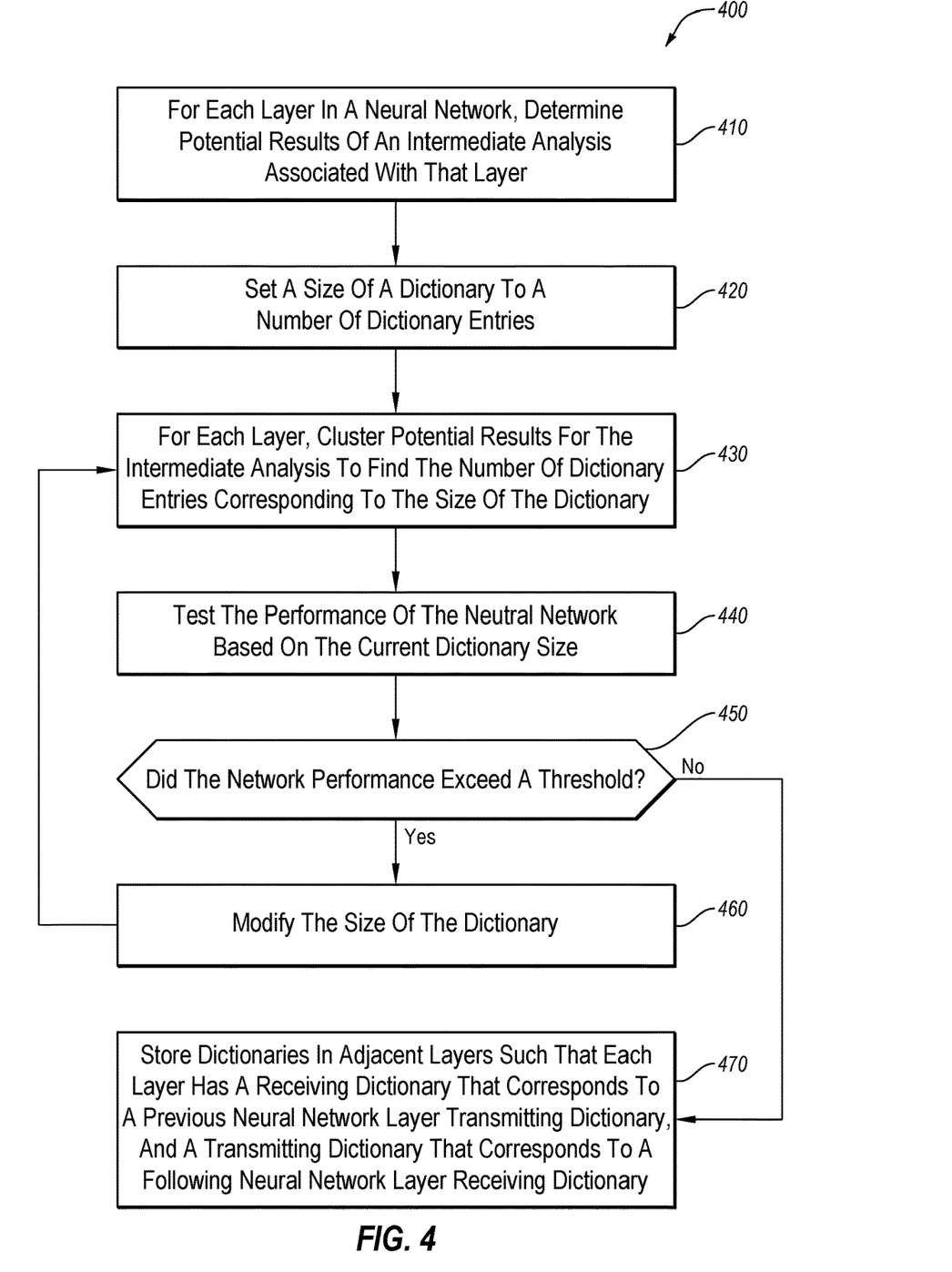
FIG. 4 is a flowchart of an example method of preparing a neural network.

FIG. 4 is a flowchart illustrating an example method 400 of preparing a neural network, in accordance with one or more embodiments of the present disclosure. The method 400 may be performed by any suitable system, apparatus, or device. For example, the system 100 or the central control device 110 of FIG. 1, or the neural network system 200 of FIG. 2 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 410, potential results of a data structure analysis (e.g., the first data structure analysis 224 of the first layer 210 or the second data structure analysis 264 of the second layer 250 of FIG. 2) associated with an intermediate layer of a neural network (e.g., the first layer 121, the second layer 122, or the N layer 123 of the system 100 of FIG. 1, or the first layer 210 or the second layer 250 of the neural network system 200 of FIG. 2) may be determined. The potential results of such a data structure analysis may include complex data structures. For example, a sample data set may be provided to the data structure analysis for an intermediate layer and the output data structures based on the sample data set may be observed. The sample data set may be selected to provide the potential results of the data structure analysis of the layer. In some embodiments, the sample data set may be different for different layers or the same for each of the layers. In these and other embodiments, the operation associated with the block 410 may be performed for multiple layers, including all of the intermediate layers of the neural network.

At block 420, the size of a dictionary may be set to a number of dictionary entries. For example, the dictionary size for all dictionaries in the neural network (e.g., the first receiving dictionary 222, the first transmitting dictionary 226, the second receiving dictionary 262, and the second transmitting dictionary 266 of the neural network system 200 of FIG. 2) may be set to the same number of dictionary entries. Additionally or alternatively, each correlated pair of dictionaries that share at least one overlapping entry (e.g., the first transmitting dictionary 226 and the second receiving dictionary 262 of FIG. 2) may have the size of the dictionary set to the same number of dictionary entries. In these and other embodiments, different correlated pairs of dictionaries may have different sizes. In some embodiments, the size of a dictionary may be restricted based on the capabilities of the device(s) expected to implement the layers of the neural network. For example, for limited computing devices, the dictionary size may be limited to thirty-two entries or less.

At block 430, the potential results for the data structure analysis may be clustered to find values and electronic messages for each dictionary entry, the number of dictionary entries corresponding to the size of the dictionary. In some embodiments, the clustering may include selecting a limited number of representative entries for a larger set of possible outputs. For example, if the dictionary size were selected to be thirty-two entries and there were three hundred possible results, thirty-two of the potential data structure results would be selected as entries in the dictionary based on the clustering, rather than keeping the possible three hundred results. In some embodiments, the clustering is performed using a k-means algorithm, a principal component whitening algorithm, or any other of a variety of algorithms or analyses to select a limited number of representative entries from a large data set. For example, using a k-means algorithm, the number of clusters may correspond to the number of dictionary entries. In these and other embodiments, each dictionary entry may have a data structure determined from the clustering and may have a correlated electronic message assigned thereto. For example, after the data structures have been selected, each data structure may be assigned a correlated simple value. For example, each value may be assigned a unique set of bits. In these and other embodiments, the operation associated with the block 430 may be performed for multiple layers, including all of the intermediate layers of the neural network.

At block 440, the performance of the neural network may be tested based on the currently selected dictionary size. For example, a testing dataset with an expected result may be provided to the neural network and the neural network analysis may be performed to yield an output. However, the output may not be exactly the expected output because of the use of the dictionaries. In some embodiments, more than one sample dataset may be processed to test the performance of the neural network. In some embodiments, testing the performance of the neural network may include testing a single intermediate layer, multiple intermediate layers, or all of the intermediate layers of the neural network.

At block 450, a determination may be made as to how the neural network performed compared to a threshold. For example, a determination may be made as to how close the results of the neural network analysis using the dictionaries were to the expected results. If the neural network exceeded a threshold, the method 400 may proceed to block 460 and if the method 400 did not exceed the threshold, the method 400 may proceed to block 470. In some embodiments, the threshold may include outputting a value within ten percent of the expected value. The threshold may also include within five percent, fifteen percent, twenty-five percent, fifty percent, or one hundred percent of the expected value. In some embodiments, the performance of a single intermediate layer, multiple intermediate layers, or all of the intermediate layers of the neural network may be measured against the threshold.

At block 460, based on the network not performing well, the size of the dictionary may be modified. For example, the size of the dictionary may be increased to provide better performance of the neural network. The method 400 may then proceed to block 430 to re-cluster the potential results and generate a dictionary based on the increased number of entries.

At block 470, based on the network performing above the threshold, the dictionaries may be stored in adjacent layers such that each layer has a receiving dictionary that corresponds to a previous neural network layer transmitting dictionary and has a transmitting dictionary that corresponds to a following neural network layer receiving dictionary. For example, the first layer may have a receiving dictionary (e.g., the first receiving dictionary 222 of FIG. 2) stored that corresponds to a transmitting dictionary of a previous network layer. The first layer may have a transmitting dictionary (e.g., the first transmitting dictionary 226 of FIG. 2) stored that corresponds to a receiving dictionary of a next network layer (e.g., the second receiving dictionary 262 of the second network layer 250 of FIG. 2).

Accordingly, the method 400 may be used for preparing a neural network. Modifications, additions, or omissions may be made to the method 400 without departing from the scope of the present disclosure. For example, the blocks 450 and/or 460 may be omitted. As another example, the operations of method 400 may be implemented in differing order. For example, the block 470 may be performed before the blocks 440, 450, and/or 460. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In some embodiments, the method 300 of FIG. 3 and the method 400 of FIG. 4 may be combined. For example, the method 400 may be utilized to prepare a neural network for analysis, and after, the method 300 may be utilized to perform neural network analysis according to the method 300.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of neural network analysis, the method comprising:
    receiving a first electronic message from a previous neural network layer and storing the first electronic message in a storage device;
    decoding the first electronic message to output a first data structure, the first electronic message referencing a first dictionary entry that correlates the first electronic message to the first data structure in a first dictionary, the first data structure including more bits than the first electronic message, the first data structure part of a previous sample data set representative of potential results of previous data structure analysis of the previous network layer;
    providing the first data structure to a processing element to perform a data structure analysis in a neural network on the first data structure, the data structure analysis yielding a second data structure including more bits than the first electronic message, the second data structure part of a sample data set, the sample data set representative of potential results of the data structure analysis, the second data structure also part of the previous sample data set;
    matching the second data structure to a second dictionary entry that correlates the second data structure to a second electronic message, the second electronic message including fewer bits than the second data structure;
    transmitting the second electronic message instead of the second data structure to a next neural network layer;
    testing performance of a second dictionary that includes the second dictionary entry by testing the neural network using the second dictionary to obtain a neural network performance;
    determining that the neural network performance exceeds a predetermined threshold; and
    based on the neural network performance exceeding the predetermined threshold, adjusting the size of the second dictionary such that the first dictionary used to communicate with the previous neural network layer is different in size than the second dictionary used to communicate with the next neural network layer, the adjustment to the size of the second dictionary occurring despite the second data structure being in both the previous sample data set and the sample data set.

2. The method of claim 1, further comprising:
    determining the potential results for the data structure analysis;
    setting a size of the second dictionary to a number of dictionary entries; and
    clustering the potential results for the data structure analysis to determine multiple different entries for the second dictionary, a number of the different entries determined corresponding to the size of the second dictionary.

3. The method of claim 2, further comprising, based on the testing, storing the second dictionary in communication with the processing element and transmitting the second dictionary to another neural network layer component.

4. The method of claim 2, wherein the clustering is performed using one of a k-means algorithm or a principal component analysis whitening algorithm.

5. The method of claim 1, wherein the first electronic message is received from the previous neural network layer, the previous neural network layer including a third dictionary with the first dictionary entry and the previous neural network layer generates the first electronic message based on the first dictionary entry matching the first data structure.

6. The method of claim 1, wherein the first electronic message includes fewer than thirty-two bits and the first data structure includes a thirty-two bit floating point value.

7. The method of claim 1, further comprising:
    receiving the second electronic message corresponding to the second dictionary entry that correlates the second electronic message to the second data structure; and
    in response to decoding the second electronic message, retrieving the second data structure; and
    outputting the second data structure.

8. The method of claim 1, wherein the first dictionary includes the first dictionary entry and less than thirty-two additional dictionary entries.

9. The method of claim 1, wherein the method is performed on a mobile device.

10. A neural network computing system comprising:
    a first neural network layer of a neural network, including:
        a first storage device storing a first dictionary entry correlating a first data structure with a first electronic message, the first data structure part of a first sample data set representative of potential results of a first data structure analysis of the first network layer; and
        a first transmission component configured to transmit the first electronic message, the first electronic message including fewer bits than the first data structure;
    a second neural network layer including:
        a second storage device configured to store the first electronic message received from the first neural network layer;

a second processing element configured to:
   read the first electronic message from the first neural network layer and output the first data structure based on the first dictionary entry in a first dictionary;
   perform a second data structure analysis on the first data structure to yield a second data structure, the second data structure part of a second sample data set, the second sample data set representative of potential results of the second data structure analysis, the second data structure also part of the first sample data set;
   match the second data structure to a second dictionary entry that correlates the second data structure to a second electronic message, the second electronic message including fewer bits than the second data structure;
   test performance of a second dictionary that includes the second dictionary entry by testing the neural network using the second dictionary to obtain a neural network performance;
   determine that the neural network performance exceeds a predetermined threshold; and
   based on the neural network performance exceeding the predetermined threshold, adjust the size of the second dictionary such that the first dictionary that is used to communicate between the first neural network layer and the second neural network layer is different in size than the second dictionary that is used to communicate between the second neural network layer and a third neural network layer, the adjustment to the size of the second dictionary occurring despite the second data structure being in both the first sample data set and the second sample data set; and
   a second transmission component configured to transmit the second electronic message to the third neural network layer.

11. The neural network computing system of claim 10, wherein the first electronic message includes fewer than thirty-two bits and the first data structure includes a thirty-two bit floating point value.

12. The neural network computing system of claim 10, wherein the first dictionary includes the first dictionary entry and less than thirty-two additional dictionary entries and is included in both the first and second neural network layers.

13. The neural network computing system of claim 10, wherein the first storage device and the second storage device are different regions of a single physical device, and the first neural network layer and the second neural network layer are logical layers of the single physical device.

14. The neural network computing system of claim 10, wherein the first neural network layer and the second neural network layer are on different physical devices communicating over a network.

15. A method of preparing a neural network, the method comprising:
   determining potential results of a first data structure analysis associated with a first layer of a neural network as a first sample data set, the first sample data set including a first data structure;
   determining potential results of a second data structure analysis associated with a second layer of the neural network as a second sample data set, the second sample data set including the first data structure, the second layer of the neural network located after the first layer in the neural network;
   setting a size of a first dictionary to a number of dictionary entries for communication between the first and the second layer;
   clustering the potential results of the first data structure analysis to determine data structures and an associated electronic message for each of the number of dictionary entries, the number of dictionary entries corresponding to the size of the first dictionary;
   testing performance of the first dictionary for communication between the first and the second layer of the neural network by testing the neural network using the first dictionary to obtain a neural network performance;
   determining that the neural network performance exceeds a predetermined threshold;
   based on the neural network performance exceeding the predetermined threshold, adjusting the size of the first dictionary such that the first dictionary used for communication between the first neural network layer and the second neural network layer is different in size than a second dictionary used to communicate between the second neural network layer and a third neural network layer located after the second neural network layer, the adjustment to the size of the first dictionary occurring despite overlap in at least one of the potential results of the first sample data set and the second sample data set; and
   storing the first dictionary in the second layer and the first neural network layer in the neural network such that the second neural network layer in the neural network has a receiving dictionary that is correlated to the first dictionary and the first layer has a transmitting dictionary that is correlated to the first dictionary, the first dictionary different in size from the second dictionary.

16. The method of claim 15, further comprising performing additional testing of the performance of the first dictionary with the adjusted size.

17. The method of claim 15, wherein the size of the first dictionary has a value of between zero and thirty-two entries.

18. The method of claim 15, wherein, for each layer of the neural network, the receiving dictionary and the transmitting dictionary are different.

19. The method of claim 15, further comprising:
receiving data for analysis in the neural network; and
rather than transmitting the data, looking up a dictionary entry with a corresponding electronic message and transmitting the electronic message.

* * * * *